March 10, 1959

V. K. RELF 2,877,335

WATER HEATING AND BOILING WATER CONTROL APPARATUS

Filed Sept. 10, 1956

INVENTOR
*Victor Keith Relf*

BY
*Watson, Cole, Grindle & Watson*
ATTORNEY

United States Patent Office 2,877,335
Patented Mar. 10, 1959

2,877,335
WATER HEATING AND BOILING WATER CONTROL APPARATUS

Victor Keith Relf, Auckland, Auckland, New Zealand

Application September 10, 1956, Serial No. 609,041

Claims priority, application New Zealand September 14, 1955

5 Claims. (Cl. 219—38)

My invention relates to water heating apparatus and the control of filling and pressure in a boiler or cylinder designed to hold water under pressure and above atmospheric boiling point. This will provide that the inflow of water does not cause loss of pressure or temperature beyond the limits required to deliver at all times, water, at or slightly above atmospheric boiling point upon the opening of the delivery valve or tap 9 see diagram.

The water is supplied for such purposes as tea making, sterilising, dish washing and wherever quantities of boiling water are readily required.

A main object of the invention is to provide an apparatus of the kind referred to with a simple and effective heat control, and a controlled means of filling governed by the cylinder pressure or temperature, that will operate at a predetermined setting, irrespective of water supply pressure, and incorporating a cutout mechanism to prevent over filling of the cylinder.

Another object of my invention is to provide means for the supplying of low pressure steam for heating milk and other liquids. The said means to be fully automatic both in pressure control and the replacement of evaporated water.

According hereto, the invention generally covers the control of water heating and boiling water supplying apparatus adapted to hold water, under steam pressure and at a temperature above atmospheric boiling point until released at the manually controlled draw-off point, water replacement being so controlled as to ensure the supply of boiling water even throughout the refilling of the cylinder.

Figure 1:
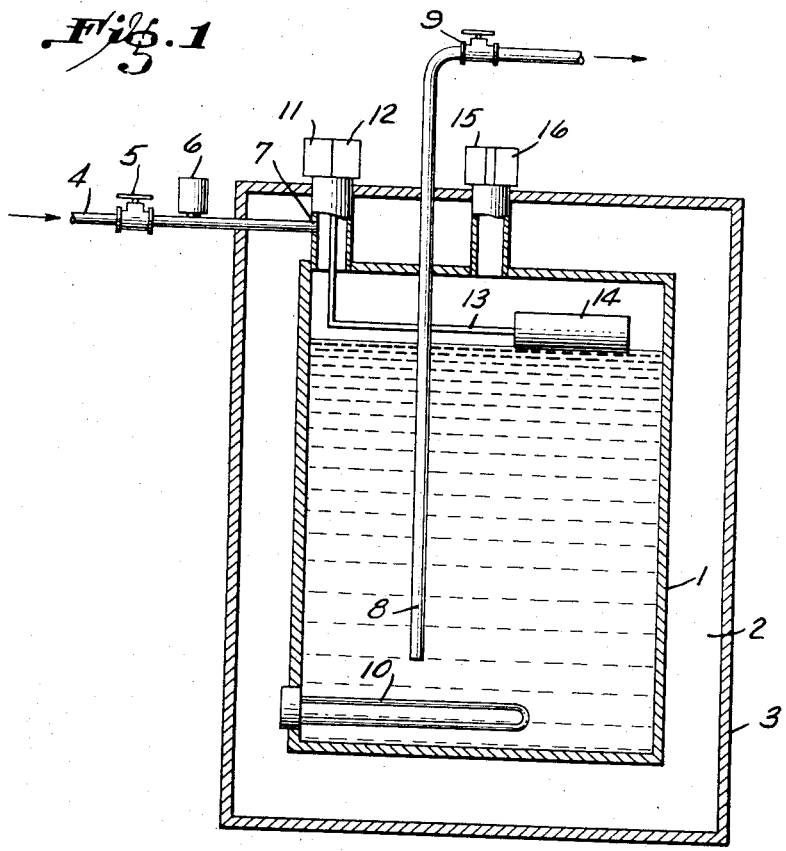
Figure 2:
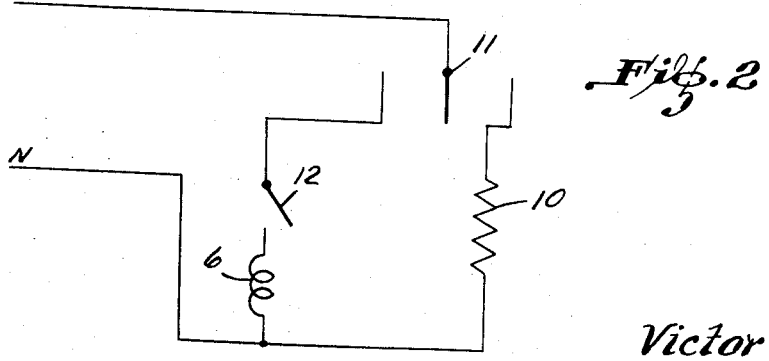

These and other objects are effected by my invention as will be apparent from the following description and claims taken in accordance with the accompanying drawing, forming a part of this application, in which:

Fig. 1 is a vertical cross section of the water heating apparatus with certain parts shown diagrammatically, and Fig. 2 is a wiring diagram.

A water holding boiler or cylinder 1 is enclosed in an outer casing 3 and the space between 2 insulated to prevent unnecessary loss of heat.

The water supply point 4 is connected through a water hammer reducing valve 5 and a solenoid valve 6 and fed into the cylinder's steam head at point 7. The source of water supply may be either high or low pressure of preheated water. The water hammer reducing valve 5 is of smaller orifice than that of the solenoid valve 6 and is only required when the unit is connected to a high pressure water supply, and the quiet operation of the solenoid valve is desired.

The solenoid valve 6 is connected electrically to a thermal or barostatic controlling switch 11 located so as to respond readily to any variation in steam pressure.

The barostatic control switch 11 is of the single pole changeover design and is also connected electrically to the heating element 10 which is situated as close as possible to the bottom of the cylinder 1.

A draw-off pipe 8 is taken from above the element 10 and as directly as possible to a convenient outlet which is manually controlled by a tap or valve 9.

A cut-out switch mechanism 12 is connected electrically in series with the barostatic control 11 and the solenoid valve 6 so that when the water level reaches a predetermined point the circuit to the solenoid valve 6 is broken and the cylinder 1 will not fill beyond this point. When a steam supply is required the maximum water level can be set to ensure that the steam is reasonably dry by adjusting the position of float 14 which is carried on arm 13 and operates cut-out switch 12.

The barostatic control switch 11 can be changed for a thermostat with changeover switch and sufficiently close differential to maintain the correct pressure range, as an alternative.

A pressure release valve 15 is provided to protect the cylinder 1 from excess pressure and also a two-way air bleed valve 16 to allow the escape of air when filling and heating and also to allow air to enter the cylinder on cooling and condensing of steam.

Alternatively an expansion pipe can be taken from a little above the bottom of the cylinder 1 and to sufficient height to give a hydraulic head of water equal to the operating pressure of the unit. This pipe replaces the pressure release valve 15 and can also be adapted to facilitate the air bleed valve 15 so that air escapes into the expansion pipe.

Heating is suitably by an electric element 10, but other means may be adapted, such as gas burner.

The operation of the above apparatus is described as follows: It is important to ensure that the heating element 10 is covered with sufficient water before switching on the electric supply.

As the unit heats, the air is expelled through the air bleed valve 16 and when steam is generated in cylinder 1 the valve 16 closes and steam pressure begins to build up. When the steam pressure reaches say 6 lbs. per sq. inch the barostatic control 11 cuts out the heating element 10 and at the same time opens the solenoid valve 6 so that water enters the cylinder 1 at point 7 cooling the contents and lowering the steam pressure to say 5 lbs. per sq. inch. At this pressure the barostatic control switch 11 closes the solenoid valve 6 and cuts in the element 10.

This cycle continues until the water level rises to the level set by float 14. At this point float 14 operates cut-out switch 12 which breaks the circuit to the solenoid valve 6. The pressure is maintained by the barostatic control switch 11.

On opening valve 9 the water is expelled by the steam pressure in the cylinder 1. As the level of the water drops the float 14 actuates the cut-out switch 12 so that the filling cycle commences again until the level of the water is restored to the maximum level set by the float.

While I have shown my invention in but one form, it is obvious to those skilled in the art that it is not limited but is susceptible of various changes and modifications without departing from the spirit thereof, and I desire, therefore, that only such limitations shall be placed thereupon as are imposed by the prior art or as are specifically set forth in the appended claims.

I claim:

1. Water heating and hot water supplying apparatus of the type in which the water is maintained at a temperature above atmospheric boiling point and under sufficient pressure to prevent the water from boiling at that temperature, comprising a boiler cylinder, a float controlled switch means, a pressure thermostatic control means, a solenoid valve means provided in an inlet means for the boiler, an electrically actuated heating means in the boiler, and an electrical circuit connected so that the solenoid valve is closed to prevent entry of water for heating unless the pressure or temperature within the apparatus has been raised to a substantially predetermined extent and the float switch prevents entry of water into the apparatus when the water level therein has attained a substantially predetermined level.

2. Water heating and hot water supplying apparatus according to claim 1 in which an electrical cut-out is provided to prevent overfilling of the cylinder.

3. Water heating and hot water supplying apparatus according to claim 1 in which a water hammer reducing valve is connected to the water supply.

4. Water heating and hot water supplying apparatus according to claim 1 in which a two-way automatic air bleed valve is connected to the boiler to allow air to escape on heating and to re-enter the cylinder when cooling to protect the cylinder from collapsing.

5. Water heating and hot water supplying apparatus according to claim 1 in which a pressure release valve is connected to the boiler.

References Cited in the file of this patent

UNITED STATES PATENTS 2,420,624   Schaub _____ May 13, 1947
2,623,153   McGinnis _____ Dec. 23, 1952

OTHER REFERENCES

Brayman: "High Temperature Hot Water Heating" in "The Tech Eng's News," May 1946, pp. 342–345, 364.